Figure 5:
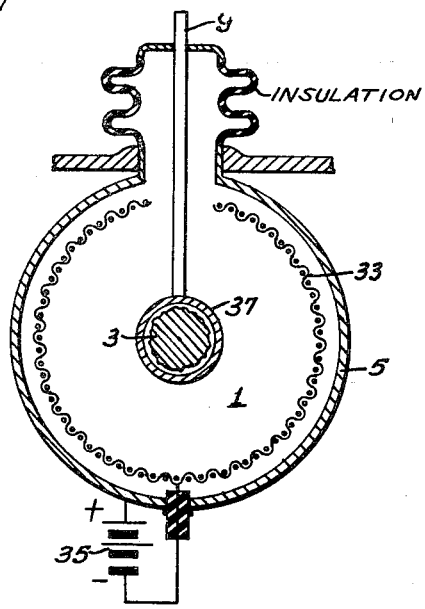

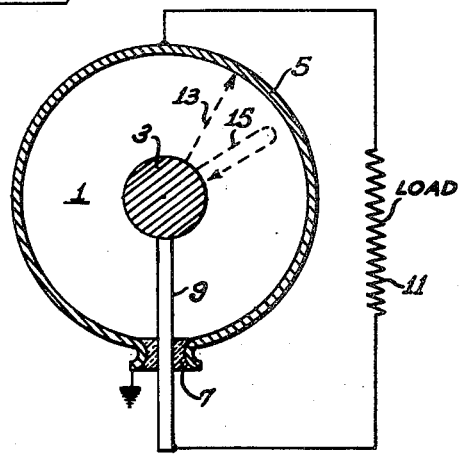
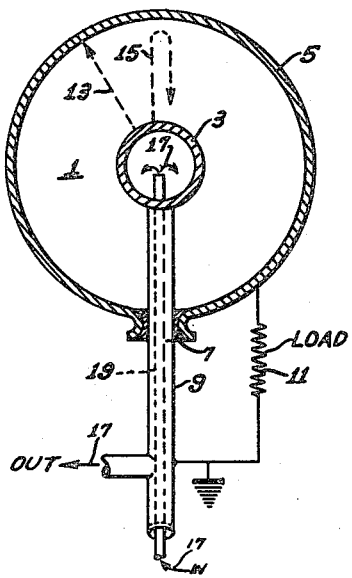
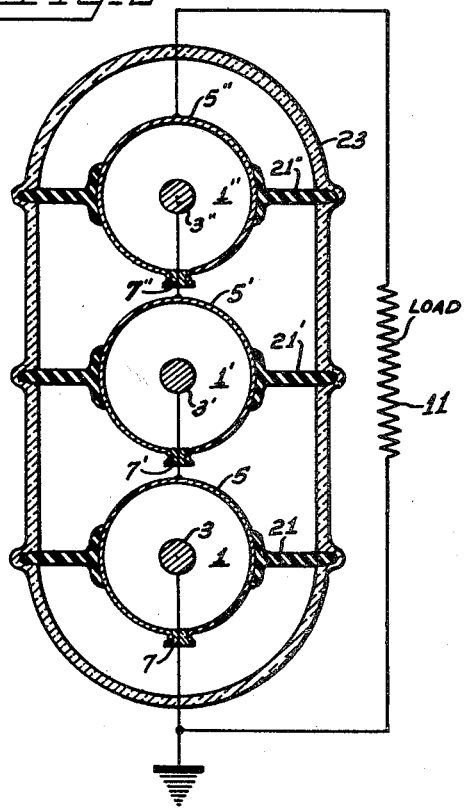
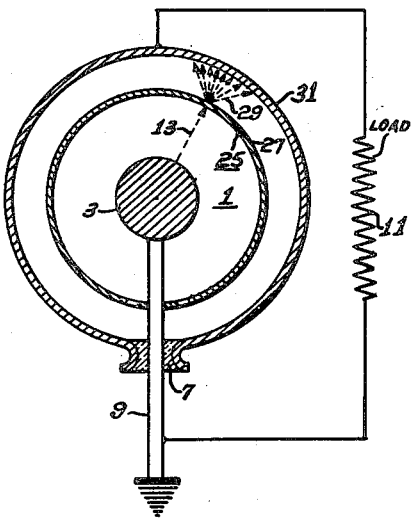
INVENTOR.
Ernest G. Linder
ATTORNEY

Oct. 31, 1950 — E. G. LINDER — 2,527,945
METHOD OF AND APPARATUS FOR GENERATION OF ELECTRICAL
ENERGY FROM NUCLEAR REACTIONS

Filed June 25, 1946 — 2 Sheets-Sheet 2

INVENTOR.
Ernest G. Linder
BY
ATTORNEY

Patented Oct. 31, 1950

2,527,945

UNITED STATES PATENT OFFICE 2,527,945

METHOD OF AND APPARATUS FOR GENERATION OF ELECTRICAL ENERGY FROM NUCLEAR REACTIONS

Ernest G. Linder, Princeton, N. J., assignor to Radio Corporation of America, a corporation of Delaware Application June 25, 1946, Serial No. 679,082

9 Claims. (Cl. 171—330)

This invention relates generally to the generation of electrical energy and more particularly to unique methods of and means for deriving and utilizing the electrical energy of nuclear reactions.

The enormous magnitudes of energy provided by certain nuclear reactions of radioactive substances provide a tremendous field for the development of new sources of electrical energy. Since some radioactive radiations (energy) are largely electrical in nature, it is desirable that such electrical energy be converted directly to electrical energy of usable form. The alpha-particle and beta-particle emissions from certain radioactive substances comprise positively or negatively charged particle rays, respectively, having energies which vary from low values to several million electron volts. For example, alpha-ray emission comprises positively charged particles having energies varying from zero to the order of ten million electron volts, while beta-particle emission comprises negatively charged particles having energies varying from low values to the order of three million electron volts. Nuclear reactions are known to provide either alpha-particle emission, beta-particle emission, or a combination of alpha-particle and beta-particle emission as well as other types of charged particles not generally so well known. The direct utilization of the high electrical potentials which may be derived from such charged particles provides, in the cases in which the particle emission is charged, much more convenient and efficient utilization of nuclear energy than previously proposed systems wherein the nuclear energy is converted to thermal energy, the thermal energy converted to mechanical energy, and the mechanical energy then converted to electrical energy in a usable form. Also, the direct utilization of the electrical energy of nuclear reactions may be much more readily controlled by electrical methods than may the conversion of nuclear energy to thermal energy.

The instant invention comprises improvements on the methods and systems disclosed and claimed in applicant's copending U. S. application, Serial No. 679,081, filed June 25, 1946 which contemplates the use of collector electrodes for collecting the charged particle rays from a radioactive source, and means for applying the resultant unidirectional potential between the source and collector electrodes to a load. One of the improvements comprising the instant invention includes additional electrode means responsive to charged particle radiation from said source for providing high magnitude secondary-electron-emission for high load current applications. Other improvements comprise the use of auxiliary suppressor electrodes for segregating desired and undesired radioactive radiation components to minimize generator leakage currents.

Among the objects of the invention are to provide improved methods of and means for generating electrical energy in response to nuclear reactions. Another object is to provide improved methods of and means for utilizing the electrical energy in nuclear reactions for generating high unidirectional potentials. An additional object is to provide improved methods of and means for utilizing atomic energy for generating electrical energy. A still further object of the invention is to provide improved methods of and means for utilizing radioactive materials as sources of electrical energy.

Another object of the invention is to provide improved methods of and means for converting atomic energy directly to electrical energy in commercially usable forms. An additional object is to provide improved methods of and means for employing nuclear reactions to generate relatively large electrical currents. A further object is to provide improved methods of and means for utilizing either charged or uncharged particle emission, or both, of nuclear reactions of radioactive materials for initiating secondary-electronic emission to provide high output currents. A still further object is to provide improved methods of and means for segregating and separately utilizing the electrical energy of alpha-ray and beta-ray emissions of radioactive materials for generating electrical energy. Another object is to provide improved methods of and means for minimizing leakage currents in radioactive electric generators. An additional object is to provide improved methods of and means for utilizing directly the electrical energy of the alpha-ray or beta-ray emission provided by nuclear reactions of radioactive materials for generating electrical potentials or currents in commercially usable form.

Figure 6:
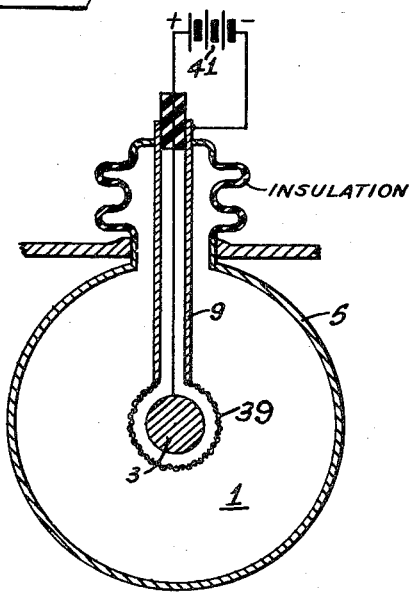

The various embodiments and features of the invention will be described in detail hereinafter by reference to the accompanying drawings of which Figure 1 is a schematic diagram of the basic embodiment of the invention disclosed in said copending application and including a simple unidirectional voltage generator; Figure 2 is a schematic diagram of a modification of said basic embodiment of the invention; Figure 3 is a schematic diagram of a further modification of said basic embodiment of the invention; Figure 4 is a schematic diagram of a first embodiment of the instant invention comprising an electrical generator providing relatively high load current in response to nuclear reactions of a radioactive source; Figure 5 is a cross-sectional diagram of a second embodiment of the instant invention; and Figure 6 is a cross-sectional schematic diagram of a third embodiment of the instant invention. Similar reference characters are applied to similar elements throughout the drawings.

High-voltage D.-C. generators

Referring to the drawings, Figure 1 illustrates the simplest form of the invention disclosed in said copending application and included herein for the purpose of describing the principles and operation of the system comprising a unidirectional high voltage generator 1. The generator 1 includes a source 3 of alpha-rays or beta-rays derived from a quantity of radioactive material. A suitable alpha-ray radioactive source may comprise, for example, a quantity of polonium ($_{84}Po^{210}$). Likewise, a suitable beta-ray source may comprise a suitable quantity of radioactive phosphorus ($_{15}P^{32}$). Radioactive phosphorus is a pure beta-ray emitter which becomes stable after emission. It is thus suitable for use as an electronic power source since it emits no gaseous reaction products and, therefore, it is suitable for vacuum applications. One gram of this material occupies about .5 cubic centimeter and will emit about 2 milliamperes of electron current. The maximum energy of the beta rays is of the order of 1.7 million electron volts, but only a small fraction of the electron current would be available at such a high voltage. However, about 1 milliampere of current would be emitted at one megavolt. Since the average energy of emission would be about 1 million electron volts, the total electrical energy or power emitted would be about 2 kilowatts. The half-life period of radioactive phosphorus ($_{15}P^{32}$) is about 14 days, and the current and power would decrease exponentially to one-half their initial values in that time.

The radioactive source 3 is surrounded, for example, by a spherical highly evacuated conductive collector electrode 5 having an aperture insulator 7 therein for a suitably insulated terminal 9 for the radioactive source 3. A load 11 is connected between the collector electrode 5 and the source terminal 9. If desired, the collector electrode 5 may be grounded.

In operation, and in the absence of a load, beta particles (electrons) emitted by the radioactive source 3 travel to the collector electrode 5 and charge it negatively as indicated by the dash line arrow 13. The charge upon the collector electrode is negative with respect to the source 3 and increases until the potential of the collector electrode is sufficiently high to repel additional electrons arriving from the source 3 as shown by the dash line arrow 15. If it is assumed that the radioactive source 3 emits 1 megavolt electrons (beta rays), the potential of the collector electrode 5 would reach one megavolt and would be negative with respect to the radioactive source. If a load is connected between the collector electrode and the source terminal, a current will flow through the load and power will be dissipated therein. Thus the radioactive energy emitted in the beta-rays may be employed directly in its original electrical form to provide electrical energy.

Known beta-ray emitters provide electrons having energies from almost zero to 3 million electron volts. Known alpha-ray emitters provide positively charged alpha particles having energies from about zero to the order of 10 million electron volts. If desired, an alpha-particle source may be employed instead of a beta-particle source, in which case the collector electrode 5 will be charged positively until it reaches a potential sufficiently high to repel additional alpha particles. In such a modification of the invention, the collector electrode 5 becomes the positive terminal and the radioactive source 3 the negative terminal of the generator. Obviously also other types of charged particles may be used.

The electric current produced by any source of charged particles is $$i = e\frac{dn}{dt} \quad (1)$$

where $n$ is the number of particles emitted, $t$ is the time in seconds, and therefore $dn/dt$ is the rate of particle emision, and $e$ is the electrical charge per particle. If each particle carries more than one electronic charge, $e$ must be replaced by $\mu e$, where $\mu$ is the number of charges.

For a radioactive substance $$dn/dt = -\lambda n \quad (2)$$

(see Pollard and Davidson, Applied Nuclear Physics, p. 105), where $\lambda$ is the decay constant and is related to the half life $t_H$ by the equation $$\lambda = \frac{0.693}{t_H} \quad (3)$$

From Equations 1, 2 and 3 it is seen that $$i = -\mu e n \frac{0.693}{t_H} \quad (4)$$

The number of atoms contained in a substance of mass M and atomic weight A is $$n = \frac{M}{m_H A} \quad (5)$$

where $m_H$ is the mass of the hydrogen atom. Thus $$i = \frac{0.693 M e}{m_H A t_H} \quad (6)$$

This relation may be expressed in amperes per gram for a predetermined quantity of a radioactive substance wherein $e = 1.59 \times 10^{-19}$ coulombs, $M = 1$ gram, $m_H = 1.66 \times 10^{-24}$ grams and $t_H = 8.64 \times 10^4 \, T_H$, where $T_H$ is the half life in days.

Therefore, $$i_1 = \frac{0.76 \mu}{A T_H} \quad (7)$$

If the radioactive source is polonium, $A = 210$ and $T_H = 140$, $\mu = 2$, therefore $$i_1 = \frac{0.76 \times 2}{210 \times 140} = 51.8 \, 10^{-6} \text{ amps./gram} \quad (8)$$

$$= 51.8 \text{ microamps./gram}$$

The characteristics of the charged particle emitting substance determine not only the output voltage of the generator, but also determine its impedance. Thus, since alpha particles generally have a very uniform energy, the generated voltage would remain substantially constant until all the remaining current was drawn, whereupon the voltage would decrease rapidly. Thus, with an alpha-particle emitter, the generator would have a low effective internal impedance. In contradistinction thereto, beta particles are usually emitted over a wide energy range which may vary from a very low value to several million electron volts. Consequently, when current is drawn from the generator to a load, the load voltage would immediately drop to a much lower value than the no load maximum, as is characteristic of all generators having high internal impedance. The actual variation of load voltage with current would depend upon the particular characteristics of the beta-ray emitting material. In general the available power depends upon the quantity of radioactive material employed and upon its rate of particle emission. Materials which emit at high rates have short operating life, while materials emitting at low rates have relatively longer operating lives. A D.-C. generator of the type described has particular application for systems requiring high voltage and low power capacity since in such instances only a relatively small amount of radioactive material is required for the alpha- or beta-ray source.

For generators providing relatively large power values, cooling of the charged particle source may be necessary or desirable since the source is bombarded and heated by the returning charged particles which are reflected by the charged collector electrode. Also the collector electrode is heated by the charged particles which it collects. A simple system for cooling the charged particle emitter is shown in Figure 2 wherein the charged particle source 3 comprises a relatively thin shell of radioactive material into which air or water under pressure may be forced for cooling purposes as indicated by the arrows 17. The radioactive source terminal 9 may comprise a hollow tube forming a cooling fluid outlet and a coaxially disposed inner tube 19 forming a cooling fluid inlet. If desired, the collector electrode 5 may be cooled by air blasts.

Multiple stage D.-C. generator

Referring to Figure 3, a multiple stage high voltage D.-C. generator may be provided by connecting in series several units of the type described heretofore by reference to Fig. 1. The only limits to the number of units which may be serially connected are those of insulation breakdown and practical mechanical construction. For example, three such serially connected units 1, 1', and 1" supported, respectively, by brackets 21, 21' and 21", are enclosed within an evacuated envelope 23. The collector 5 of the unit 1 is connected to the source 3' of the unit 1', and the collector 5' of the unit 1' is connected to the source 3" of the unit 1". The load 11 is connected between the source 3 of the unit 1 and the collector 5" of the unit 1". A very high degree of vacuum is essential to prevent ionization within the evacuated chamber and within the several units. For protection against X-ray emission or other harmful radiation, the collector electrodes 5, 5' and 5" should be sufficiently thick to absorb practically all such radiation. Metal electrodes having a thickness of several millimeters should be sufficient in most cases. Also the envelope 23 may be of metal or other radiation absorptive material in order further to minimize danger from such radiation.

High current D.-C. generator

Referring to Figure 4, a generator supplying much lower voltages but high load currents comprises a radioactive source 3 which is surrounded by a thin metallic shell 25 which emits secondary electrons from its outer surface 27 in response to particle bombardment of its inner surface as indicated by the dash line arrow 13. Secondary electrons may be produced by bombardment by either charged or uncharged primary particles. The secondary electrons emitted from the outer surface 27 of the secondary electron emissive shell 25 are indicated by the dash line arrows 29. The shell 25 should be of extremely thin metal and, if desired, may be coated with secondary-electron-emissive material. The secondary electrons are collected by an outer collector electrode 31. Since only the low energy secondary electrons reach the collector 31, the load voltage may be a relatively low value and the load current a relatively high value as compared with the unit described heretofore by reference to Fig. 1.

Secondary electron suppression

The principal limitations on the potentials which may be attained by the devices described heretofore is due to leakage currents. Some of the leakage currents are due to the inherent limitations of insulating materials and the proportions thereof as determined by the proportions of the generator unit. Insulator leakage currents may be reduced to negligible values by employing insulator materials and shapes commonly used in high voltage work. Another serious source of leakage currents arises from the nature of radioactive radiations themselves.

Referring again to Figure 1 of the drawings, beta rays striking the collector electrode 5 will cause secondary electron emission therefrom. Such secondary electrons will be attracted toward the radioactive source 3 which is positively charged with respect to the collector electrode 5, and thus will tend to neutralize the positive charge on the radioactive source and hence decrease the potential difference between the source 3 and the collector 5.

Referring to Figure 5, in order to reduce the effect of secondary electron emission from the collector electrode 5, a grid or thin metallic shell 33 is introduced into the generator in a region intermediate the source 3 and collector 5, and is maintained at a comparatively small negative potential with respect to the collector electrode 5 by a battery 35 connected between the collector and grid electrodes. The biasing potential may be of the order of 100 to 1000 volts. As explained heretofore, this potential may be derived from a separate radioactive D.-C. generator since the energy required is practically negligible. The negatively biased grid electrode 33 suppresses substantially all secondary electrons emitted by the collector electrode 5 and thus permits the potentials between the radioactive source 3 and the collector electrode 5 to build up to a value determined by the velocity of emission of the beta rays and the load resistance, as described heretofore.

Alpha-particle suppression

A further source of leakage would occur in instances wherein the radioactive source 3 emits positively charged alpha particles as well as negatively charged beta particles. The alpha particles in traveling to the collector electrode 5 would neutralize some of its negative charge and thus reduce the potential existing between the radioactive source and the collector electrode. In such instances the radioactive source 3 may be enclosed within a thin metallic envelope 37. The envelope 37 should be of such material and thickness, (for example, aluminum of .005") that it is substantially opaque to alpha-particle emission but is substantialy transparent to beta-particle emission.

Delta-particle suppression

Referring to Figure 6, when an alpha-particle radioactive source is employed, leakage may result due to $\delta$ rays which are slow electrons which accompany the emission of alpha rays. Such $\delta$ rays would be drawn to the collector electrode 5, which in this instance would be positively charged with respect to the alpha emitting source 3, and would result in charge neutralization on the collector electrode. To decrease this effect, the alpha particle emitting source 3 may be surrounded by a grid 39 which is maintained at a comparatively low negative voltage with respect to the alpha-particle source 3. This voltage may be derived from an external battery 41 connected between the source 3 and the grid 39 or it may be derived from an auxiliary radioactive generator. The bias voltage applied to the grid 39 should be sufficiently high to suppress and reflect back to the source substantially all $\delta$ rays emitted by the radioactive source 3, but will have little effect upon the highly positively charged alpha particles emitted by the source.

Following is a partial list of alpha- and beta-ray emitters which are suitable for high voltage generators of the types described heretofore:

| Element | Half-life, days | Energy (equivalent million electron volts) |
|---|---|---|
| ALPHA-RAY EMITTERS | | |
| Polonium ($Po^{210}$) | 140 | 5.25 |
| Actinium ($Ac^{223}$) | 11.2 | 5.66 |
| Thorium X ($Th\ X^{224}$) | 3.64 | 5.65 |
| Radio actinium ($Rd\ Ac^{227}$) | 18.9 | 5.92 |
| BETA-RAY EMITTERS | | |
| Phosphorus ($P^{32}$) | 14 | 1.7 |
| Calcium ($Ca^{45}$) | 180 | 0.2 |
| Scandium ($Sc^{46}$) | 85 | 0.9 / 0.26 |
| Iron ($Fe^{59}$) | 47 | 1.5 / 0.4 / 0.9 |
| Arsenic ($As^{74}$) | 16 | 1.3 |
| Strontium ($Sr^{89}$) | 55 | 1.5 |
| Antimony ($Sb^{124}$) | 60 | 1.53 |
| Tungsten ($W^{185}$) | 77 | 0.5 |

Thus the invention described and claimed herein comprises unique methods of and means for generating unidirectional or alternating potentials by utilizing directly the electrical properties of radioactive emission. Such generators may provide high or low unidirectional potentials with relatively low or relatively high current output, respectively. A radioactively excited secondary-electron-emission generator is disclosed. Means are provided for segregating desired and undesired radiations to minimize generator leakage currents.

I claim as my invention:

1. The method of utilizing a source of radioactive particle radiations for primarily generating electrical energy comprising the steps of utilizing said radiations in a region adjacent to said source to establish a potential with respect to said source, suppressing undesired charged particle emission or radiation between said source and said region, and utilizing said potential to provide an electric current.

2. Apparatus for primarily generating electrical energy including a source of radioactive material providing charged particle emission, means disposed in a region adjacent to said source responsive at least indirectly to at least a portion of said charged particle emission for establishing a potential with respect to said source, means for suppressing undesired charged particle emission or radiation between said source and said means, and means for utilizing said potential.

3. Apparatus for generating electrical energy including a source of radioactive material providing beta-particle emission, means disposed in a region adjacent to said source for collecting said emitted particles to establish a potential with respect to said source, said collected particles producing secondary-electron-emission from said collecting means, means negatively biased with respect to said collecting means and disposed between said source and said collecting means for preventing said secondary-electron-emission from reaching said source, and means for utilizing said potential to provide an electric current.

4. Apparatus for generating electrical energy including a source of radioactive material providing beta-particle emission, means disposed in a region adjacent to said source for collecting said emitted particles to establish a potential with respect to said source, said collected particles producing secondary-electron-emission from said collecting means, a suppressor screen electrode negatively biased with respect to said collecting means and disposed between said source and said collecting means for preventing said secondary-electron-emission from reaching said source, and means for utilizing said potential to provide an electric current.

5. Apparatus for primarily generating electrical energy including a source of radioactive material providing both alpha- and beta-particle emission, means disposed in a region adjacent to said source for collecting said beta-particle emission to establish a potential with respect to said source, means substantially transparent to beta-particle emission and substantially opaque to alpha-particle emission surrounding and insulated from said source and disposed between said source and said collecting means for preventing alpha-particles from reaching said collecting means, and means for utilizing said potential to provide an electric current.

6. Apparatus for primarily generating electrical energy including a source of radioactive material providing both alpha- and beta-particle emission, means disposed in a region adjacent to said source for collecting said beta-particle emission to establish a potential with respect to said source, a thin metallic screen substantially transparent to beta-particle emission and substantially opaque to alpha-particle emission surrounding and insulated from said source and disposed between said source and said collecting means for preventing alpha-particles from reaching said collecting means, and means for utilizing said potential to provide an electric current.

7. Apparatus for generating electrical energy including a source of radioactive material providing both alpha- and beta-particle emission, means disposed in a region adjacent to said source for collecting said beta-particle emission to establish a potential with respect to said source, means substantially transparent to beta-particle emission and substantially opaque to alpha-particle emission surrounding said source and disposed between said source and said collecting means for preventing alpha-particles from reaching said collecting means and wherein said collected beta-particles produce secondary-electron emission from said collecting means, means disposed between said source and said collecting means for preventing said secondary-electron-emission from reaching said source, and means for utilizing said potential to derive an electric current.

8. Apparatus for generating electrical energy including a source of radioactive material providing both alpha- and delta-particle emission, means disposed in a region adjacent to said source for collecting asid emitted alpha-particles to establish a potential with respect to asid source, means substantially transparent to alpha-particle emission and substantially opaque to delta-particle emission surrounding said source and disposed between said source and said collecting means for preventing delta-particles from reaching said collecting means, and means for utilizing said potential to provide an electric current.

9. Apparatus for generating electrical energy including a source of radioactive material providing both alpha- and delta-particle emission, means disposed in a region adjacent to said source for collecting said emitted alpha-particles to establish a potential with respect to said source, screen electrode means negatively biased with respect to said source and substantially transparent to alpha-particle emission and substantially opaque to delta-particle emission surrounding said source and disposed between said source and said collecting means for reflecting and preventing delta-particles from reaching said collecting means, and means for utilizing said potential to provide an electric current.

ERNEST G. LINDER.

REFERENCES CITED

The following references are of record in the file of this patent:

UNITED STATES PATENTS

| Number | Name | Date |
|---|---|---|
| 1,670,483 | Rentschler | May 22, 1928 |
| 1,747,063 | Dushman | Feb. 11, 1930 |
| 1,748,386 | Loewe | Feb. 25, 1930 |
| 1,756,889 | Thompson | Apr. 29, 1930 |
| 2,032,545 | McElrath | Mar. 3, 1936 |
| 2,104,100 | Roberts | Jan. 4, 1938 |

OTHER REFERENCES

Radio Engineering, Terman, 2d edition, page 137, McGraw Hill Book Company, New York, 1937.